United States Patent
Agrawal et al.

(10) Patent No.: US 11,661,544 B1
(45) Date of Patent: May 30, 2023

(54) FILTER CAKE REMOVAL COMPOSITIONS AND METHODS OF MAKING AND USING SAME

(71) Applicant: Halliburton Energy Services, Inc., Houston, TX (US)

(72) Inventors: Amit Agrawal, Pune (IN); Pratiksha Shivaji Meher, Pune (IN); Kim Teng Yeo, Kuala Lumpur (MY)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/544,686

(22) Filed: Dec. 7, 2021

(51) Int. Cl.
  *C09K 8/528* (2006.01)
  *E21B 37/06* (2006.01)
  *C09K 8/12* (2006.01)

(52) U.S. Cl.
  CPC ............... *C09K 8/528* (2013.01); *C09K 8/12* (2013.01); *E21B 37/06* (2013.01); *E21B 2200/08* (2020.05)

(58) Field of Classification Search
  None
  See application file for complete search history.

(56) References Cited

U.S. PATENT DOCUMENTS

2014/0113843 A1* 4/2014 Shumway ............... C09K 8/74
  507/261

\* cited by examiner

*Primary Examiner* — Andrew Sue-Ako
(74) *Attorney, Agent, or Firm* — Conley Rose, P.C.; Rodney B. Carroll

(57) ABSTRACT

A breaker composition comprising (i) a first acid precursor, (ii) a second acid precursor and (iii) an aqueous fluid wherein the first acid precursor has an effective operating temperature of from about 15° C. to about 120° C. and the second acid precursor has an effective operating temperature of from about 30° C. to about 180° C.

16 Claims, 5 Drawing Sheets

FILTER CAKE REMOVAL COMPOSITIONS AND METHODS OF MAKING AND USING SAME

FIELD

This application relates to the recovery of natural resources from a wellbore penetrating a subterranean formation, and more specifically this application relates to compositions and methods for filter cake removal.

BACKGROUND

Natural resources such as gas, oil, and water residing in a subterranean formation can be recovered by drilling wells into the formation. Well drilling involves drilling a wellbore down to the formation while circulating a drilling fluid or mud through the wellbore. Various types of drilling fluids, also known as drill-in fluids when used in the productive interval, have been used in well drilling, such as water-based fluids, mineral oil-based fluids, and synthetic oil-based fluids. Such drilling fluids form a thin, slick filter cake on the formation face that provides for successful drilling of the wellbore and that helps prevent loss of fluid to the subterranean formation.

In well drilling, several stages may be used to produce oil found in subterranean formations. The first stage, which is known as the primary production stage, allows the oil to flow into a production well (or wells) under natural forces. At first, the natural forces may be sufficient to drive the oil to the surface where it is recovered. However, at some point, pumps may be required to displace the oil from the wellbore to the surface. A secondary recovery operation thus is typically performed to recover additional amounts of the oil from the reservoir. A common secondary recovery operation known as secondary flooding involves injecting a fluid such as water into a so-called injection well (or wells) to drive oil in the formation to the production well (or wells). Tertiary recovery operations such as tertiary flooding may also be used to drive the remaining oil from the formation to the production well.

Typically, the presence of the filter cake on the face of the subterranean formation can adversely affect the flow of fluid though the injection wells and the production wells. For example, pump fracturing pressures required to inject past the filter cake are higher than desirable for achieving good sweep efficiency of the oil reservoir fluid filter-cake clean-up is achieved by using slow releasing acids, chelating agents, oxidizers, enzyme treatments, or combinations of these materials. Ester-based products releasing in-situ acids are the materials of choice in the industry for their neutral nature at surface and easy operation. The rate of hydrolysis of these esters and consequently the rate of filtercake cleanup depends on numerous factors such as wellbore temperature, pH and ester type. Given the multifactorial nature of the hydrolysis rate an ongoing need exists for methods and compositions that provide effective filtercake removal over a range of conditions.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
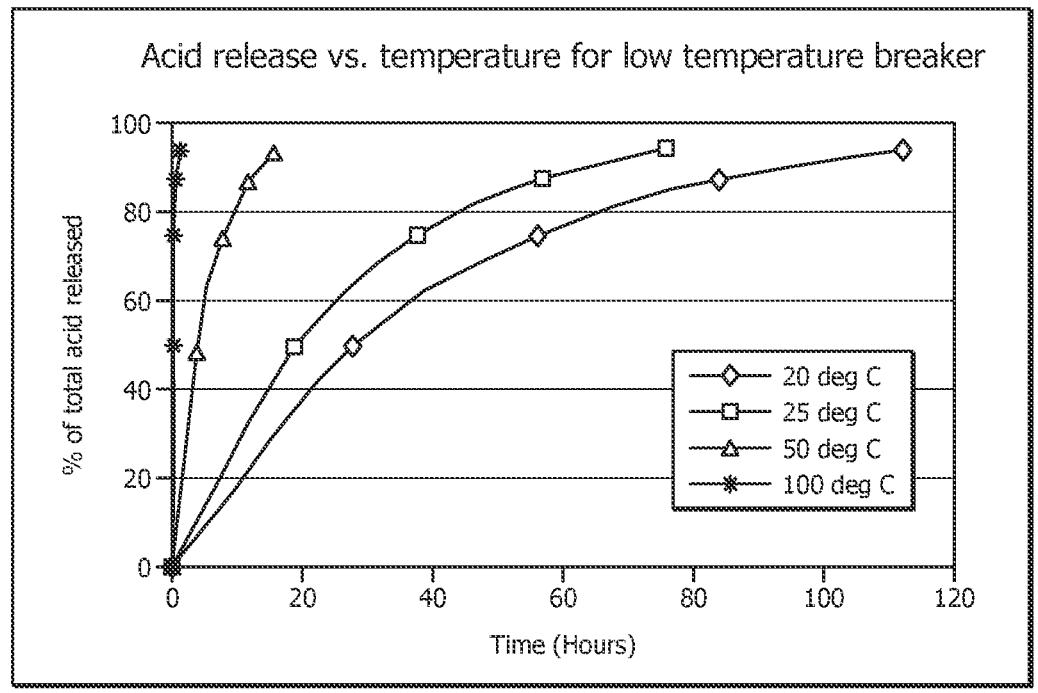
FIG. 1 is a graph of the percentage acid released as a function of time for low temperature filter cake breaker solutions.

Disclosed herein is a synergistic filtercake breaking system, designated SFBS, comprising a first breaker and a second breaker. In one or more embodiments, the first breaker comprises an acid precursor that is activated to release a first acid at a first temperature ranging from about 86° F. to about 185° F. In one or more embodiments, the second breaker comprises an acid precursor that is activated to release a second acid at a second temperature ranging from about 185° F. to about 400° F. In some embodiments, the first acid released at the first temperature facilitates release of a second acid from the second breaker. In some embodiments, the first temperature is lower than the second temperature.

In one or more embodiments, release of the first acid from the first breaker occurs at a rate that facilitates or catalyzes the release of the second acid from the second breaker in a continuous fashion such that a plot of the total amount of acid release from the SFBS is governed by a singular rate. In other words, the SFBS displays a rate of acid generation that is reflective of a composite rate of the acid release from the first breaker and acid release from the second breaker. In some embodiments, a plot of the amount of acid released from the SFBS excludes an inflection point. It is contemplated that hydrolysis of the first acid precursor and second acid precursor are concomitant reactions.

In some embodiments, the SFGS comprises (i) a lower-temperature breaker (e.g., a lower temperature acid precursor); (ii) a higher-temperature breaker (e.g., a higher temperature acid precursor) and (iii) an aqueous fluid.

In one or more embodiments, the SFBS is used for the removal of a water-based filtercake that has been contaminated with oil wet components (e.g., crude oil). Hereinafter, the disclosure will refer to the use of the SFBS for the removal of a water-based filtercake although the removal of other types of filtercake are also contemplated. The SFBS may be placed downhole and used to service a wellbore, for example providing for removal of a filter-cake. Each of the components of the SFBS as well as methods of using same will be described in more detail herein.

In some embodiments, the SFBS comprises an acid precursor. Herein an acid precursor is defined as a material or combination of materials that provides for delayed release of one or more acidic species. Such acid precursors may also be referred to as time-delayed and/or time-released acids. In embodiments, acid precursors comprise a material or combination of materials that may react to generate and/or liberate an acid after a period of time has elapsed. The liberation of the acidic species from the acid precursor may be accomplished through any suitable methodology.

In embodiments, acid precursors may be formed by modifying acids via the addition of an operable functionality, component, or substituent, physical encapsulation or packaging, or combinations thereof. The operable functionality component or substituent may be acted upon in any fashion (e.g., chemically, physically, thermally, etc.) and under any conditions compatible with the components of the process in order to release the acid at a desired time and/or under desired conditions such as in situ wellbore conditions. In some embodiments, the acid precursor may comprise at least one modified acid (e.g., having an operable functionality, encapsulation, packaging, etc.) such that when acted upon and/or in response to pre-defined conditions (e.g., in situ wellbore conditions such as temperature, pressure, chemical environment), an acid is released. In some embodiments, the acid precursor comprises a material which reacts with one or more components of the SFBS (e.g., reacts with an aqueous fluid present in the SFBS) to liberate at least one acidic species.

In some embodiments, the acid precursor comprises a reactive ester. Hereinafter, for simplicity, the remainder of the disclosure will focus on the use of a reactive ester as the acid precursor with the understanding that other acid precursors may be used in various embodiments. The reactive ester may be converted to an acidic species by hydrolysis of the ester linkage, for example by contact with water present in the aqueous fluid of the SFBS and/or water present in situ in the wellbore.

In embodiments, the first breaker comprises a lower-temperature breaker (LTB) comprising an acid precursor. The LTB may be characterized by hydrolysis of the acid precursor at an effective operating temperature ranging from about 15° C. to about 120° C. The effective operating temperature is the temperature range wherein the breaker solution promotes dissolution of greater than about 50% of the filtercake. In embodiments, the second breaker comprises a high-temperature breaker (HTB) comprising an acid precursor. The HTB may be characterized by hydrolysis of the acid precursor at an effective operating temperature ranging from about 30° C. to about 180° C. In some embodiments, the LTB acid precursor differs from the HTB acid precursor. In some embodiments, the LTB hydrolyzes in a temperature range that is relatively lower than that of the HTB.

In one or more embodiments, the LTB and HTB comprise acid precursors that are reactive esters. The rate of hydrolysis of a reactive ester is dependent on a variety of factors including the temperature, specific ester and the pH of the solution. In embodiments, the reactive esters can be denoted generically as RCOOR' where R is the acidic moiety and R' is an organyl group, in RCOOR' ester RCO is derived from acid where the OH (hydroxyl group) is replaced by alkoxy/organyl group OR'. In some aspects, R is characterized by a low steric hinderance. Herein steric hinderance refers to the slowing of chemical reactions due to large groups on a molecule hindering the approach of a reactant. Without being limited by theory, the SFBS has a LTB whose hydrolysis releases an acidic species that reduces the pH of the solution thereby accelerating the rate of hydrolysis of the HTB.

Suitable acid precursors for use in the present disclosure include, without limitation, lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly (ε-caprolactones); poly(hydroxybutyrates); poly(anhydrides); aliphatic polycarbonates; poly(amino acids); and polyphosphazenes; or copolymers thereof: poly(ortho esters); orthoesters (which may also be known as "poly ortho ethers" or "ortho ethers"); esters of oxalic acid; aliphatic polyesters; poly(lactides); poly(glycolides); poly (ε-caprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof; or a combination thereof. Other suitable acid precursors include, without limitation, halide esters and esters of acids such as esters of nitric acid, sulphuric acid, sulphonic acid, sulphinic acid, phosphoric acid, phosphorous acid, phosphonic acid, phosphinic acid, sulphamic acid and the like.

In some embodiments, the acid precursor comprises diethylene glycol diformate, diethylene glycol monoformate, monoethylene monoformate, monoethylene diformate, ethyl lactate, methyl lactate, tri-n-propyl orthoformate, tri-n-butyl orthoformate, or a combination thereof.

The choice and physical form of suitable acid precursors may depend on a variety of factors including but not limited to the time at which liberation of the acidic species is desired relative to the placement of the SFBS in the wellbore; the environmental conditions presented; the conditions within the wellbore; the temperature of the wellbore section in which the SFBS is being placed; the composition of the formation water, etc.

The acid precursor (first acid precursor and second acid precursor) may be present the SFBS in an amount ranging from about 0 wt. % to about 40 wt. % based on the concentration in the brine, alternatively from about 5 wt. % to about 40 wt. %, alternatively from about 10 wt. % to about 30 wt. %, alternatively from about 15 wt. % to about 35 wt. %.

Aqueous fluids that may be used in the SFBS include any aqueous fluid suitable for use in subterranean applications. For example, the SFBS may comprise water or a brine. Suitable brines include, but are not limited to KCl, NaCl, NaBr, $CaCl_2$, $CaBr_2$, $ZnBr_2$, sodium formate, potassium formate, cesium formate, combinations thereof and derivatives thereof. The specific brine used may be dictated by the desired density of the wellbore servicing fluid. Denser brines may be useful in some instances. The density of the aqueous fluid, and likewise the density of the SFBS, may be selected and adjusted to meet one or more user and/or process goals. For example, the aqueous fluid (e.g., brine) may have a brine density ranging from about 8.3 ppg to about 20 ppg, alternatively from about 9 ppg to about 18 ppg or alternatively from about 12 ppg to about 18 ppg. In one or more embodiments, the aqueous fluid comprises the balance of the SFBS after considering the amount of the other components used.

In some embodiments, a SFBS comprises a LTB, a HTB and an aqueous fluid comprising a brine. In an embodiment, the SFBS comprises a formate ester. For example, the LTB may comprise a formate ester. Alternatively, the HTB comprises a formate ester. Alternatively, both the LTB and HTB comprise a formate ester, for example where the LTB hydrolyzes to form an acid at a temperature that is less than the temperature at which the HTB hydrolyzes to form an acid. Hydrolysis of a formate ester is known to be rapid in comparison to the hydrolysis of acetates or propionates under similar hydrolysis conditions.

In embodiments, the SFBS has a ratio of LTB:HTB ranging from about 1:99 to about 99:1, alternatively from about 20:80 to about 80:20 or alternatively from about 40:60 to about 60:40.

The components of the SFBS (e.g. acid precursors, aqueous fluid) may be combined using any mixing device compatible with the composition. In some embodiments, the components of the SFBS are combined at the well site; alternatively, the components of the SFBS are combined off-site and are transported to and used at the well site. The contacting of the components of the SFBS may initiate hydrolysis of the LTB by the aqueous fluid, for example via hydrolysis and dissociation of ester groups present in the precursors. Release of one or more acidic species from the LTB will decrease the pH of the SFBS and increase the rate hydrolysis of the HTB. The result is a composition, SFBS, tunable to some user and/or process desired effective operating temperature range. For example, an SFBS of the type disclosed herein can remove a filtercake effectively over a wide effective operating temperature range of from about 30° F. to about 450° F., alternatively from about 50° F. to about 400° F. or, alternatively from about 75° F. to about 350° F.

In some embodiments, a method of servicing a wellbore comprises drilling a wellbore in a subterranean formation and introducing to the formation an aqueous-based servicing and/or drilling fluid wherein water-coated/wet solids (e.g., filtercake, drill cuttings, etc.) are formed as a result. It is to be understood that "subterranean formation" encompasses both areas below exposed earth and areas below earth covered by water such as ocean or fresh water.

In some embodiments, the introduction of a water-based fluid (e.g., drilling fluid) may result in the deposition of the water-wet solids on the sides or surfaces within the wellbore. The water-wet solids may be components of the filter cake, a formation face, a fracture face, a perforation, or on a screen (e.g., a gravel pack screen) or another piece of equipment located in the wellbore or subterranean formation.

The method further comprises contact of the water-wet solids with a SFBS as described herein to effect removal of the water-wet solids and/or conversion of the solids from oil-wet to water-wet. For example, a SFBS may be placed in a wellbore and contacted with a filtercake or other water-wet solids located down hole. The water-wet solids when contacted with a SFBS of the type disclosed herein may become degraded by the SFBS. For example, upon becoming water-wet, acid from the SFBS may contact and decompose one or more components of the water-wet solids (e.g., calcium-based components such as calcium carbonate contained in the filtercake). The SFBS disclosed herein may result in the removal of water-wet solids (e.g. filtercake) in the temperature ranges disclosed herein while minimizing damage to the formation or to allow for other servicing operations. Following treatment with a SFBS, production can then take place, if desired or appropriate, as for example in a hydrocarbon-producing well.

EXAMPLES

The presently disclosed subject matter having been generally described, the following examples are given as particular embodiments of the subject matter and to demonstrate the practice and advantages thereof. It is understood that the examples are given by way of illustration and are not intended to limit the specification or the claims in any manner.

Example 1

Figure 2:
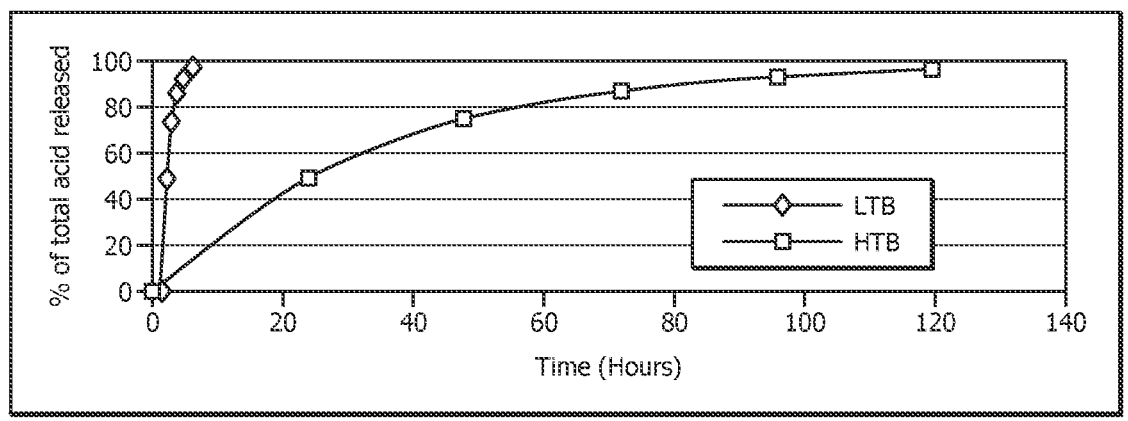
FIG. 2 is a graph of the percentage acid released as a function of time for high temperature filter cake breaker solutions.

Acid release as a function of time for both a LTB and HTB was investigated. Specifically a LTB and HTB of the type disclosed herein were reacted and the total amount of acid released monitored as a function of time and temperature. FIG. 1 is a plot of the percent of total acid released as a function of time for a LTB at the indicated temperatures. A comparison of the percent of total acid released for a LTB and HTB at 100° C. was also carried out and the results are presented in FIG. 2. With reference to FIG. 2, the LTB at 100° C. rapidly releases acid whereas the HTB shows a slow release of acid over a longer time period. A SFBS of the type disclosed herein comprising 10% of the LTB and 10% of the HTB was prepared and the total amount of acid released monitored. The SFBS showed a steady release of the acid at a temperature of 82° C.

Example 2

Figure 3A:
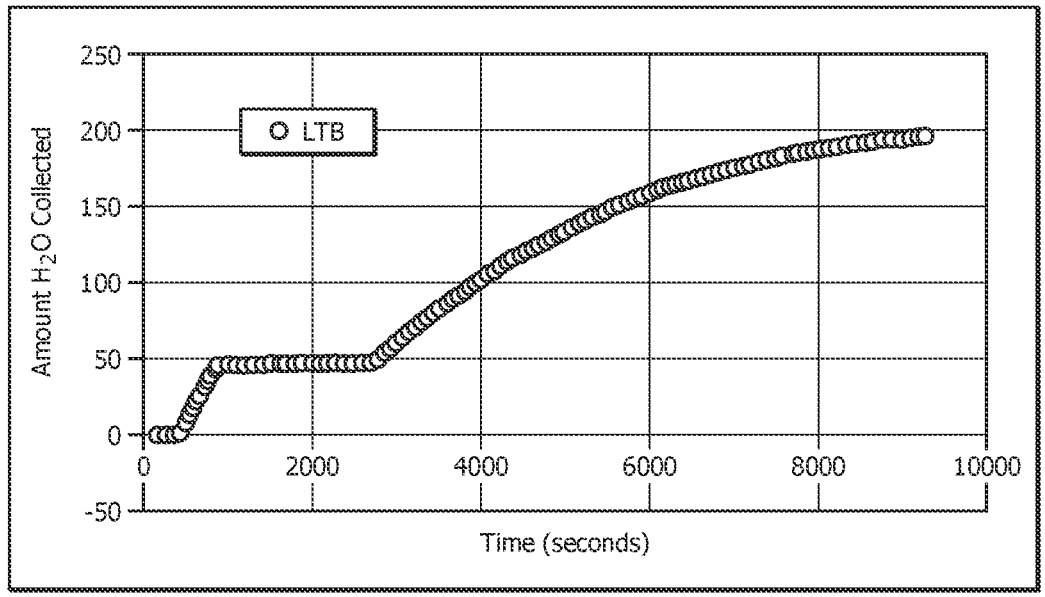
FIGS. 3A-3D are graphs of the amount of water collected as a function time for various ratios of breaker solutions.
Figure 3B:
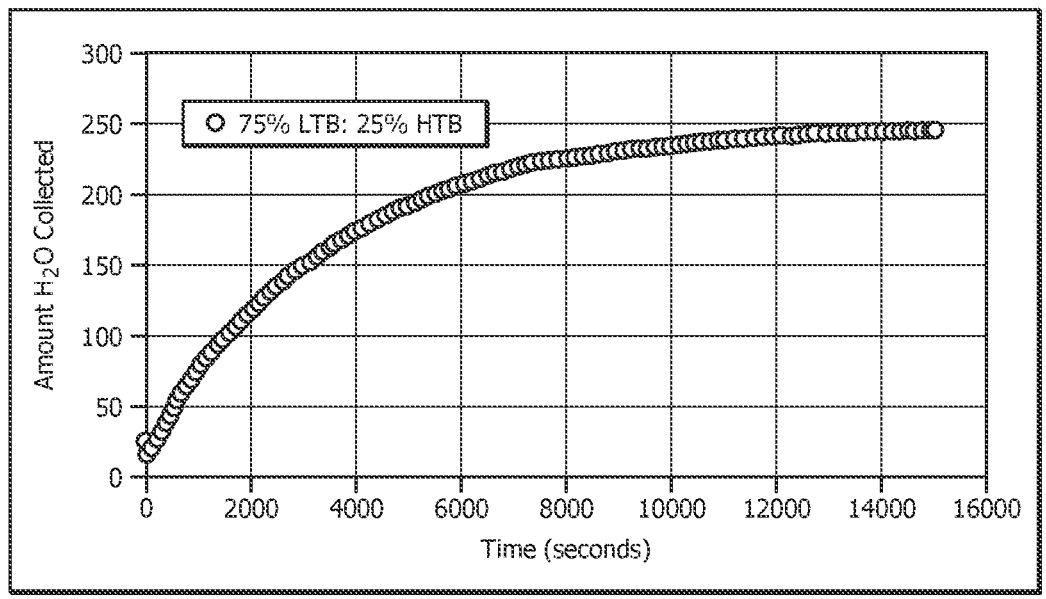
Figure 3C:
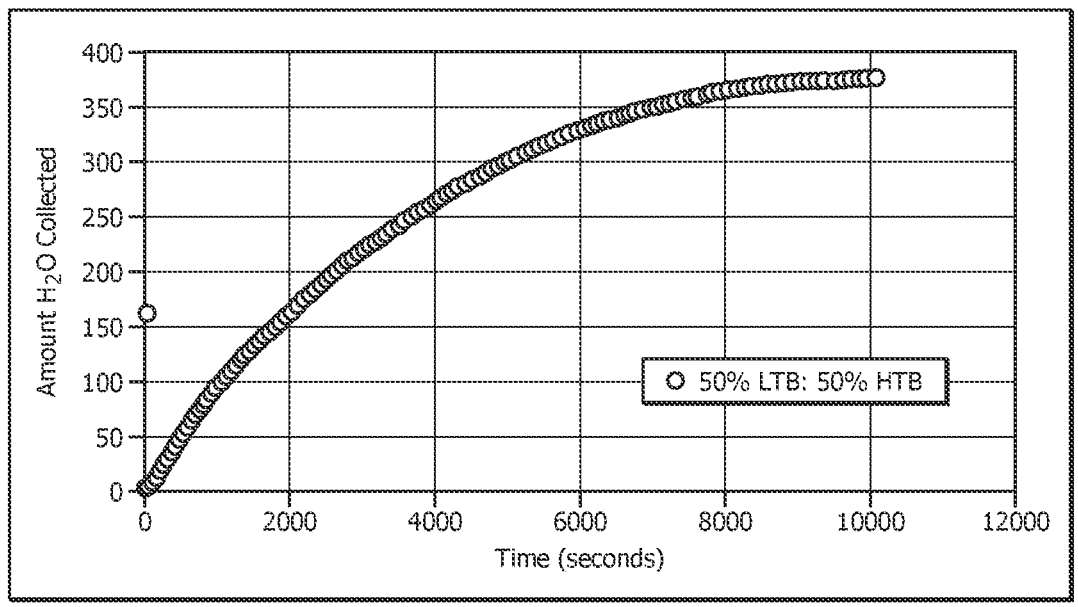
Figure 3D:
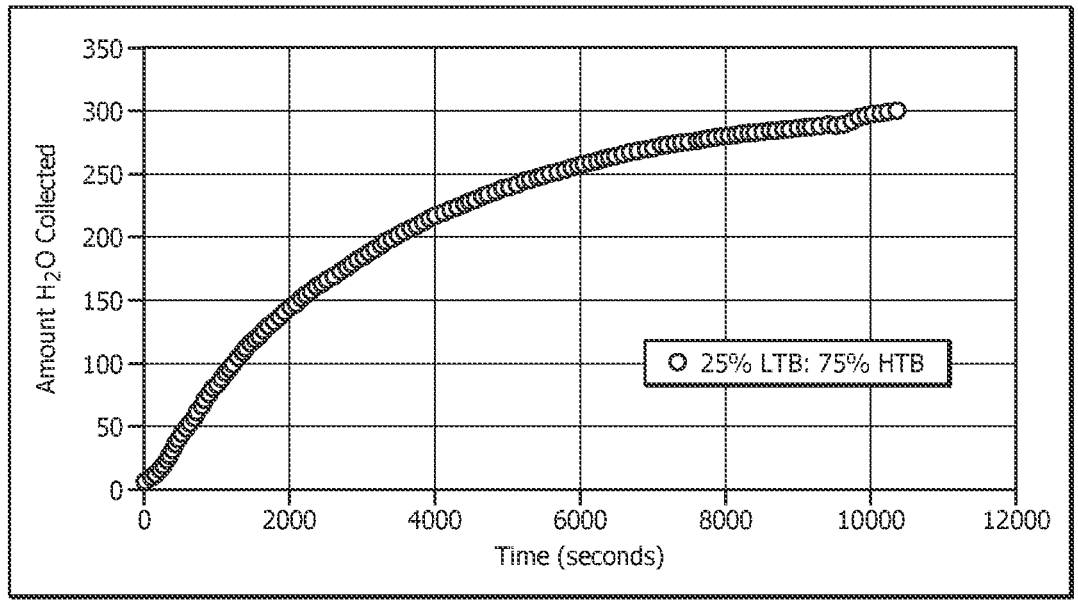

The extent of acid hydrolysis for FSBS of the types disclosed herein were investigated. The extent of acid hydrolysis was determined by placing in a first 300 ml 3 neck flask 100 ml of 10 lb/gal NaBr brine. Reagent grade calcium carbonate (1.8 grams) was then added to the brine and the solution stirred and left unsealed while it was heated to a temperature of 180° F. As the temperature approached approximately 150° F., the flask was sealed. Then 1.2 mol equivalents of an acid precursor was injected into the 300 ml flask through the septum. Carbon dioxide generated during the reaction was allowed to exit the flask and enter a second flask filled with water. The amount of water displaced from the second flask was directly correlated with the amount of carbon dioxide generated by the reaction of the acid precursor and calcium carbonate. The results of these reactions are presented in Table 1 and depicted as a graph of the amount of water collected as a function of time for a LTB (FIG. 3A), a 75:25 ratio of LTB:HTB (FIG. 3B), a 50:50 ratio of LTB:HTB (FIG. 3) and a 25:75 ratio of ratio of LTB:HTB (FIG. 3D).

TABLE 1

| | | Amount of $CO_2$ generated (mL) Non-coated BARACARB 5 + 3.5 g of LTB | | | | | | | $CO_2$ generated |
| --- | --- | --- | --- | --- | --- | --- | --- | --- | --- |
| Time (hr) | Time (min) | Run #1 | Run #2 | Run #3 | Average | Standard Dev. | Time (hr) | Time (min) | (mL) 5.1 g of HTB |
| 0.000 | 0 | 0 | 0 | 0 | 0 | 0 | 0.00 | 0 | 0 |
| 0.083 | 5 | 30 | 28 | 25 | 28 | 3 | 0.33 | 20 | 30 |

TABLE 1-continued

| Amount of CO2 generated (mL) Non-coated BARACARB 5 + 3.5 g of LTB | | | | | | | | CO2 generated | |
|---|---|---|---|---|---|---|---|---|---|
| Time (hr) | Time (min) | Run #1 | Run #2 | Run #3 | Average | Standard Dev. | Time (hr) | Time (min) | (mL) 5.1 g of HTB |
| 0.167 | 10 | 75 | 65 | 60 | 67 | 8 | 0.67 | 40 | 45 |
| 0.250 | 15 | 107 | 95 | 93 | 98 | 8 | 1.00 | 60 | 56 |
| 0.333 | 20 | 142 | 124 | 123 | 130 | 11 | 2.00 | 120 | 80 |
| 0.500 | 30 | 205 | 180 | 183 | 189 | 14 | 4.00 | 240 | 112 |
| 0.667 | 40 | 250 | 225 | 240 | 238 | 13 | 6.37 | 382 | 142 |
| 0.833 | 50 | 285 | 265 | 288 | 279 | 13 | 8.07 | 484 | 160 |
| 1.000 | 60 | 320 | 300 | 330 | 317 | 15 | 24.00 | 1440 | 255 |
| 1.333 | 80 | 365 | 358 | 375 | 366 | 9 | | | |
| 1.667 | 100 | 385 | 377 | 400 | 387 | 12 | | | |

Figure 4A:
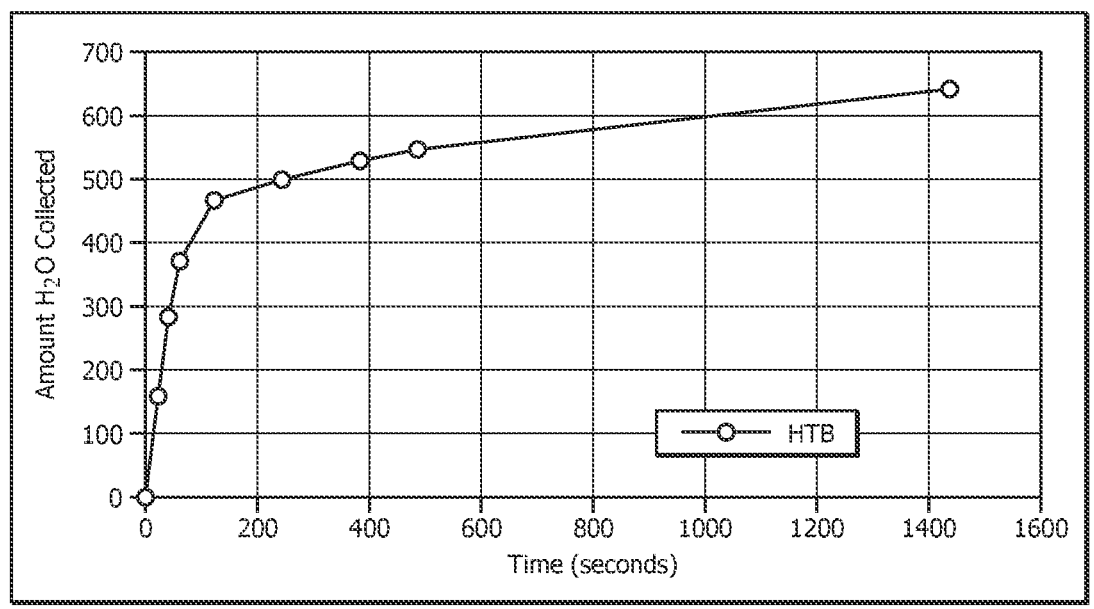
FIGS. 4A-4C are graphs of the amount of water collected as a function time for various ratios of breaker solutions.
Figure 4B:
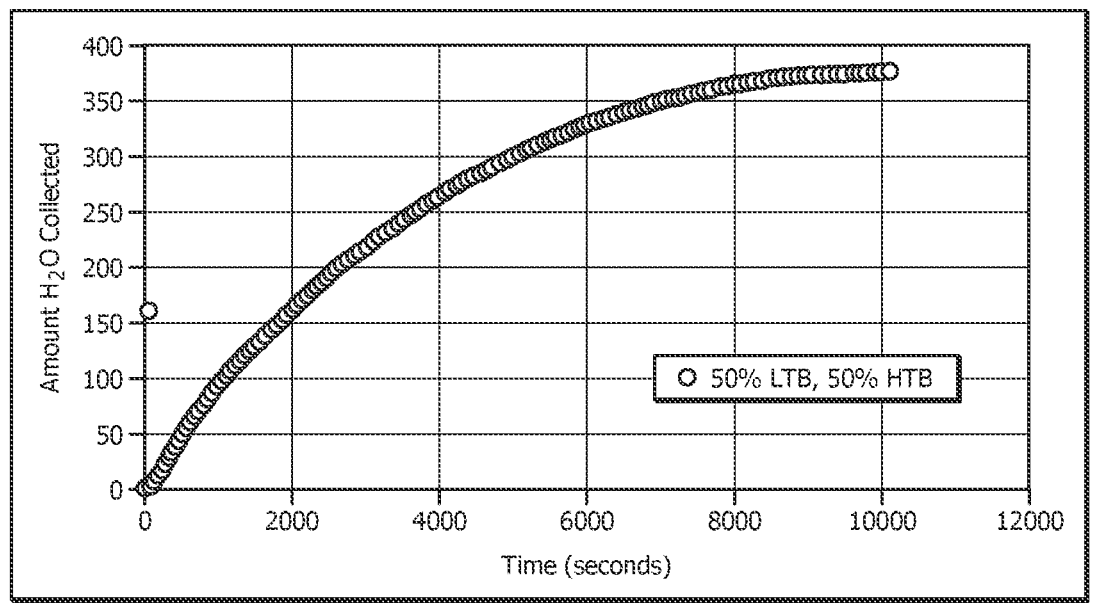
Figure 4C:
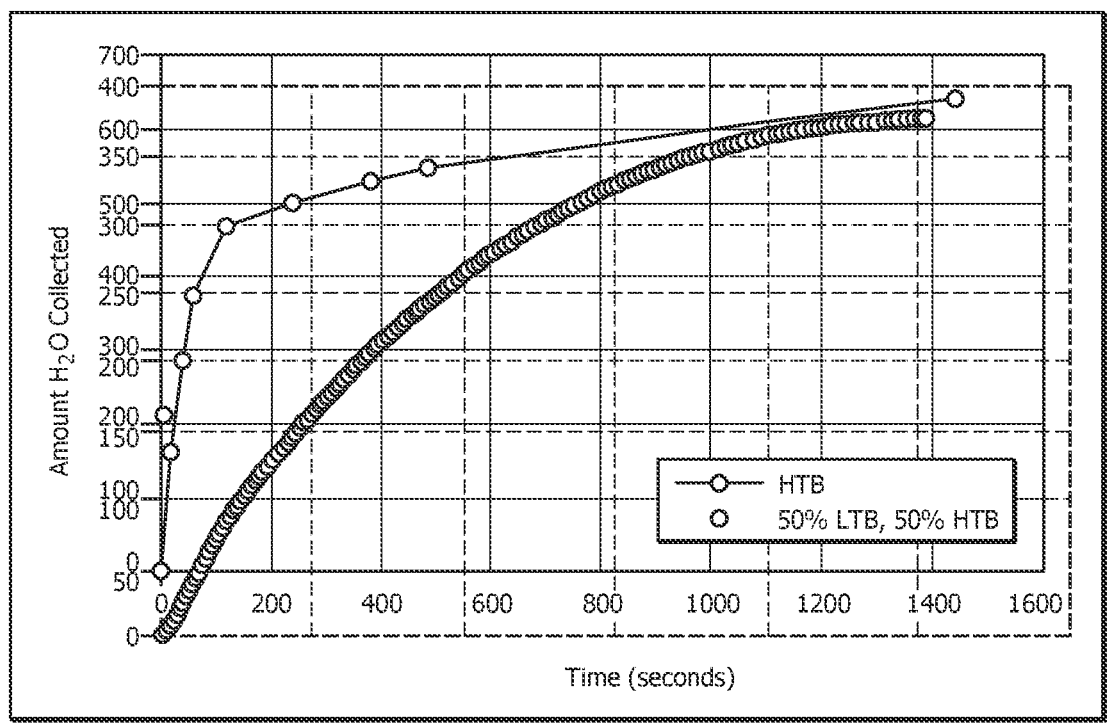

A similar set of experiments was conducted using a different HTB. A graph of the amount of water collected as a function of time for the HTB is shown in FIG. 4A while a graph of the amount of water collected as a function of time for an SFBS comprising a 50:50 ratio of LTB:HTB is presented in FIG. 4B. An overlay of these graphs is presented in FIG. 4C. The graphs display a surprisingly beneficial synergy between the LTB and HTB that indicate concomitant hydrolysis of the LTB and HTB.

Additional Disclosure

The following are non-limiting, specific embodiments in accordance and with the present disclosure:

A first embodiment which is a breaker composition comprising (i) a first acid precursor, (ii) a second acid precursor and (iii) an aqueous fluid wherein the first acid precursor has an effective operating temperature of from about 15° C. to about 120° C. and the second acid precursor has an effective operating temperature of from about 30° C. to about 180° C.

A second embodiment which is the breaker composition of the first embodiment having an effective operating temperature of from about 30° F. to about 450° F.

A third embodiment which is the breaker composition of any of the first through second embodiments wherein the ratio of first acid precursor:second acid precursor ranges from about 1:99 to 99:1.

A fourth embodiment which is the breaker composition of any of the first through third embodiments wherein the wherein the first acid precursor, the second acid precursor or both comprise lactic acid derivatives; esters that are water soluble or partially water soluble; formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

A fifth embodiment which is the breaker composition of any of the first through fourth embodiments wherein the first acid precursor, the second acid precursor or both comprise a reactive ester.

A sixth embodiment which is the breaker composition of any of the first through fifth embodiments wherein the aqueous fluid comprises a brine.

A seventh embodiment which is the breaker composition of the sixth embodiment wherein the brine comprises KCl, NaCl, NaBr, CaCl$_2$, CaBr$_2$, ZrBr$_2$, sodium formate, potassium formate, cesium formate, or a combination thereof.

An eighth embodiment breaker composition of any of the sixth through seventh embodiments wherein the brine has a density ranging from about 8.3 ppg to about 20 ppg, A ninth embodiment which is a wellbore servicing system comprising: (a) an aqueous-based drilling fluid, wherein the aqueous-based drilling fluid forms water-wet solids in the wellbore; and (i) a first acid precursor, (ii) a second acid precursor and (iii) an aqueous fluid wherein the first acid precursor has an effective operating temperature of from about 15° C. to about 120° C. and the second acid precursor has an effective operating temperature of from about 30° C. to about 180° C.

A tenth embodiment which is the wellbore servicing system of the ninth embodiment wherein the breaker composition has an effective operating temperature of from about 30° F. to about 450° F.

An eleventh embodiment which is the wellbore servicing system of any of the ninth through tenth embodiments wherein the breaker composition has a ratio of first acid precursor:second acid precursor ranging from about 1:99 to 99:1.

A twelfth embodiment which is the wellbore servicing system of any of the ninth through eleventh embodiments wherein the water-wet solids form a filtercake.

A thirteenth embodiment which is the wellbore servicing system of any of the ninth through twelfth embodiments wherein the aqueous fluid comprises a brine.

A fourteenth embodiment which is the wellbore servicing system of any of the ninth through thirteenth embodiments wherein the brine comprises KCl, NaCl, NaBr, CaCl2), CaBr2, ZrBr2, sodium formate, potassium formate, cesium formate, or a combination thereof.

A fifteenth embodiment which is a method of dissolving a filtercake comprising:contacting the filtercake with a breaker composition comprising (i) a first acid precursor, (ii) a second acid precursor and (iii) an aqueous fluid wherein the first acid precursor has an effective operating temperature of from about 15° C. to about 120° C. and the second acid precursor has an effective operating temperature of from about 30° C. to about 180° C.

A sixteenth embodiment which is the method of the fifteenth embodiment wherein contacting occurs at a temperature ranging from about 30° F. to about 450° F.

A seventeenth embodiment which is the method of any of the fifteenth through sixteenth embodiments wherein the first acid precursor, the second acid precursor or both comprise a reactive ester.

An eighteenth embodiment which is the method of any of the fifteenth through seventeenth embodiments breaker wherein the first acid precursor, the second acid precursor or both comprise a formate ester.

A nineteenth embodiment which is the method of any of the fifteenth through eighteenth embodiments wherein the aqueous fluid comprises a brine.

A twentieth embodiment which is the method of the nineteenth embodiment wherein the brine comprises KCl, NaCl, NaBr, $CaCl_2$, $CaBr_2$, $ZrBr_2$, sodium formate, potassium formate, cesium formate, or a combination thereof.

The subject matter having been shown and described, modifications thereof can be made by one skilled in the art without departing from the spirit and teachings of the subject matter. The embodiments described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as some embodiments of the present disclosure. Thus, the claims are a further description and are an addition to the embodiments of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A breaker composition comprising
   (i) a first add precursor having an effective operating temperature of from about 86° F. to about 185° F. and is selected from the group consisting of ethylene glycol monoformate, ethylene glycol diformate, diethylene glycol diformate, glyceryl monoformate, glyceryl diformate, glyceryl triformate, triethylene glycol diformate, formate esters of pentaerythritol, derivatives thereof, and combinations thereof,
   (ii) a second acid precursor having an effective operating temperature of from about 185° F. to about 400° F. and is selected from the group consisting of methyl lactate, ethyl lactate, propyl lactate, butyl lactate, derivatives thereof, and combinations thereof, and
   (iii) an aqueous fluid,
   wherein the breaker composition has an effective operating temperature of from about 30° F. to about 450° F. and wherein a graph of the amount of acid released as a function of time excludes an inflection point.

2. The breaker composition of claim 1 wherein the ratio of first acid precursor:second acid precursor ranges from about 1:99 to 99:1.

3. The breaker composition of claim 1 wherein the first acid precursor, the second acid precursor or both comprise a reactive ester.

4. The breaker composition of claim 1 wherein the aqueous fluid comprises a brine.

5. The breaker composition of claim 4 wherein the brine comprises KCl, NaCl, NaBr, $CaCl_2$, $CaBr_2$, $ZrBr_2$, sodium formate, potassium formate, cesium formate, or a combination thereof.

6. The breaker composition of claim 4 wherein the brine has a density ranging from about 8.3 ppg to about 20 ppg.

7. A wellbore servicing system comprising:
   (a) an aqueous-based drilling fluid, wherein the aqueous-based drilling fluid forms water-wet solids in the wellbore; and
   (i) a first acid precursor having an effective operating temperature of from about 86° F. to about 185° F. and is selected from the group consisting of ethylene glycol monoformate, ethylene glycol diformate, diethylene glycol diformate, glyceryl monoformate, glyceryl diformate, glyceryl triformate, triethylene glycol diformate, formate esters of pentaerythritol, derivatives thereof, and combinations thereof,
   (ii) a second acid precursor having an effective operating temperature of from about 185° F. to about 400° F. and is selected from the group consisting of methyl lactate, ethyl lactate, propyl lactate, butyl lactate, derivatives thereof, and combinations thereof, and
   (iii) an aqueous fluid,
   wherein the breaker composition has an effective operating temperature of from about 30° F. to about 450° F. and wherein a graph of the amount of acid released as a function of time excludes an inflection point.

8. The wellbore servicing system of claim 7 wherein the breaker composition has a ratio of first acid precursor:second acid precursor ranging from about 1:99 to 99:1.

9. The wellbore servicing system of claim 7 wherein the water-wet solids form a filtercake.

10. The wellbore servicing system of claim 7 wherein the aqueous fluid comprises a brine.

11. The wellbore servicing system of claim 10 wherein the brine comprises KCl, NaCl, NaBr, $CaCl_2$, $CaBr_2$, $ZrBr_2$, sodium formate, potassium formate, cesium formate, or a combination thereof.

12. A method of dissolving a filtercake comprising:
   contacting the filtercake with a breaker composition comprising
   (i) a first acid precursor having an effective operating temperature of from about 86° F. to about 185° F. and is selected from the group consisting of ethylene glycol monoformate, ethylene glycol diformate, diethylene glycol diformate, glyceryl monoformate, glyceryl diformate, glyceryl triformate, triethylene glycol diformate, formate esters of pentaerythritol, derivatives thereof, and combinations thereof,
   (ii) a second acid precursor having an effective operating temperature of from about 185° F. to about 400° F. and is selected from the group consisting of methyl lactate, ethyl lactate, propyl lactate, butyl lactate, derivatives thereof, and combinations thereof, and
   (iii) an aqueous fluid,
   wherein the breaker composition has an effective operating temperature of from about 30° F. to about 450°

F. and wherein a graph of the amount of acid released as a function of time excludes an inflection point.

13. The method of claim 12 wherein contacting occurs at a temperature ranging from about 30° F. to about 450° F.

14. The method of claim 1 wherein the first acid precursor, the second acid precursor or both comprise a reactive ester.

15. The method of claim 12 wherein the aqueous fluid comprises a brine.

16. The method of claim 15 wherein the brine comprises KCl, NaCl, NaBr, $CaCl_2$, $CaBr_2$, $ZrBr_2$, sodium formate, potassium formate, cesium formate, or a combination thereof.

* * * * *

UNITED STATES PATENT AND TRADEMARK OFFICE
CERTIFICATE OF CORRECTION

PATENT NO. : 11,661,544 B1
APPLICATION NO. : 17/544686
DATED : May 30, 2023
INVENTOR(S) : Agrawal et al.

Page 1 of 1

It is certified that error appears in the above-identified patent and that said Letters Patent is hereby corrected as shown below:

In the Claims

In Column 9, Line 50: Replace "add" with --acid--

Signed and Sealed this
Twenty-fifth Day of July, 2023

Katherine Kelly Vidal
*Director of the United States Patent and Trademark Office*